US009335428B2

(12) United States Patent
Jin

(10) Patent No.: US 9,335,428 B2
(45) Date of Patent: May 10, 2016

(54) METHOD AND SYSTEM FOR REDUCING THE LOSS CAUSED BY AN EARTHQUAKE

(76) Inventor: Xin Jin, Waterloo (CA)

( * ) Notice: Subject to any disclaimer, the term of this patent is extended or adjusted under 35 U.S.C. 154(b) by 621 days.

(21) Appl. No.: 12/138,388

(22) Filed: Jun. 12, 2008

(65) Prior Publication Data

US 2009/0312950 A1    Dec. 17, 2009

(51) Int. Cl.
| G01V 1/28 | (2006.01) |
| G01V 1/00 | (2006.01) |
| G01V 1/06 | (2006.01) |
| G21J 3/00 | (2006.01) |

(52) U.S. Cl.
CPC ........... *G01V 1/008* (2013.01); *G01V 1/06* (2013.01); *G21J 3/00* (2013.01)

(58) Field of Classification Search
CPC .............. G01V 1/008; G01V 1/06; G21J 3/00
USPC ......... 702/2, 13–18; 73/784; 340/690; 703/5; 52/167.1; 367/37, 38, 76, 77
See application file for complete search history.

(56) References Cited

U.S. PATENT DOCUMENTS

| RE36,282 | E  * | 8/1999  | Nitschke ................ 60/641.2 |
| 6,308,135 | B1 * | 10/2001 | Hocking ................... 702/2 |
| 6,462,549 | B1 * | 10/2002 | Curtis et al. ............ 324/323 |
| 6,728,640 | B2 * | 4/2004  | Mandal et al. ........... 702/15 |
| 7,234,897 | B2 * | 6/2007  | Conroy .................... 405/303 |
| 7,280,920 | B1 * | 10/2007 | Whiteside et al. ....... 702/15 |
| 7,598,884 | B2 * | 10/2009 | Lachenit et al. ......... 340/690 |
| 2006/0263152 | A1 * | 11/2006 | Conroy .................... 405/303 |
| 2009/0299637 | A1 * | 12/2009 | Dasgupta .................. 702/12 |
| 2010/0212960 | A1 * | 8/2010  | Loos et al. .............. 175/2 |

OTHER PUBLICATIONS

Lay, Thorne, "Earth Sciences 80A—Lecture 24", Mar. 9, 2001 at http://www.ic.ucsc. edu/~tlay/eart80a/Lectures/lecture24.html).*
Raliegh, C. B., J. H. Healy, J. D. Bredehoeft, "An Experiment in Earthquake Control at Rangely, Colorado", Science, vol. 191, pp. 1230-1237 (Mar. 1976).*
Cypser, D. A., "Colorado Law and Induced Seismicity", at internet URL, http://www.darlenecypser.com/induceq/Colorado Law and InducedSeismicity.html (1996).*
Lay, Thorne, "Earth Sciences 80A—Lecture 14", Oct. 22, 2002 at http://www.ic.ucsc. edu/~tlay/eart80a/Lectures/lecture14.html).*

* cited by examiner

*Primary Examiner* — Sujoy Kundu
*Assistant Examiner* — Ricky Ngon

(57) ABSTRACT

Catastrophic earthquakes cause tremendous loss to people, especially when they occur unprepared. Imminent prediction of the earthquake with occurrence time, location and magnitude may give people time to prepare for it and minimize the loss. Unfortunately, imminent prediction of the earthquakes, especially those without foreshocks, is very difficult if not impossible. This invention discloses a method and system that work around the difficulty of the imminent prediction of the earthquake. Instead of trying to predict the occurrence, it triggers the earthquake artificially at a known time so that evacuation and other preparations can be accomplished prior to the triggering time of the earthquake to reduce the loss caused by the earthquake. The artificial triggering of the earthquakes may be implemented by at least one underground nuclear explosion.

14 Claims, 2 Drawing Sheets

METHOD AND SYSTEM FOR REDUCING THE LOSS CAUSED BY AN EARTHQUAKE

CROSS-REFERENCE TO RELATED APPLICATION

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING

Not Applicable.

BACKGROUND OF THE INVENTION

1. Field of the Invention

This invention relates generally to reducing the loss and/or damage caused by an earthquake, in particular, to artificially triggering a catastrophic earthquake to happen at a known time without having to rely on imminent earthquake prediction so that pre-earthquake evacuation and preparation can be implemented prior to the known time.

2. Description of the Related Art

Catastrophic earthquakes occur almost every year in the world, causing tremendous loss and damage. Most catastrophic earthquakes are tectonic earthquakes that are caused by sudden releasing of underground elastic strain energy accumulated over time. People have been trying to develop techniques to predict the earthquakes, so that mitigation actions can be taken prior to the earthquake. Earthquake predictions may be roughly divided into four types: long-term predictions which are made in units of several tens of years; intermediate-term predictions made in units of several years; short-term predictions aiming at predicting an earthquake from several months to several tens of days before the occurrence; and imminent predictions aiming at predicting an earthquake from several days to several hours before the occurrence. While long-term predictions and intermediate-term prediction technologies have been making progress by researchers, effective pre-earthquake mitigation actions usually still have to rely on imminent earthquake predictions or at least short-term predictions. Unfortunately, due to the complexity of the nature of the tectonic earthquakes, many catastrophic earthquakes do not have any foreshocks or other indicators before occurring, imminent and short-term earthquake predictions have extremely low successful rate and many seismologists believe it is technically impossible in the foreseeable future.

Therefore, there is a need in the art to work-around the technical difficulties of imminent and/or short-term earthquake predictions to effectively enable evacuation and other pre-earthquake mitigation actions.

BRIEF SUMMARY OF THE INVENTION

In one aspect, the invention provides a method of artificially triggering the catastrophic earthquake that is predicted by long-term and/or intermediate-term prediction techniques to release its energy at a predetermined time, so that pre-earthquake mitigation actions can be completed prior to the predetermined triggering time.

In another aspect, at least one embodiment of the invention provides a system for artificially triggering the catastrophic earthquake through controlled underground explosion.

Other aspects of the invention will become clear thereafter in the detailed description of the preferred embodiments and the claims.

BRIEF DESCRIPTION OF THE DRAWINGS

For a better understanding of the invention and to show more clearly how it may be carried into effect, reference will now be made, by way of example only, to the accompanying drawings which show at least one exemplary embodiment of the invention and in which.

The same reference numerals are used in different Figs. to denote similar elements.

DETAILED DESCRIPTION OF THE INVENTION

It will be appreciated that in the description herein, numerous specific details are set forth in order to provide a thorough understanding of the invention. However, it will be understood by those of ordinary skill in the art that the invention may be practiced without these specific details. In other instances, well-known methods, procedures and components have not been described in detail so as not to obscure the invention. Furthermore, this description is not to be considered as limiting the scope of the invention, but rather as merely providing a particular preferred working embodiment thereof.

Figure 1:
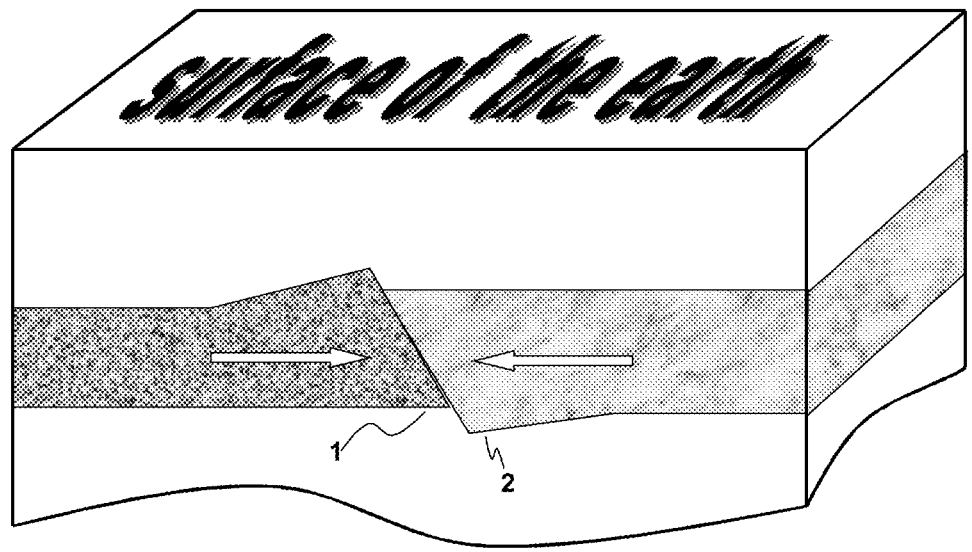
FIG. 1 illustrates a fictional and simplified cross section diagram of stress accumulation along the edges of two plates where the strength of the rock is exceeded at certain time, the earth's crust may break and cause an earthquake.

FIG. 1 illustrates a fictional and simplified cross section diagram of stress accumulation along the edges of two plates where the strength of the rock is exceeded at certain time, the earth's crust may break and cause an earthquake. In the figure, compressional stress between the plate 1 and plate 2 is shown by the arrows, which is just an example of the plate tectonic relation. Other types of the strain relation are also possible, such as transform and extension. Once the built-up stress exceeds the strength limit of the rocky structures, which may be coincident with a constructive force of tide and/or the gravity of the moon and sun, a sudden fracture and movement of rocks along a fault happens, suddenly releasing the stored elastic energy. Some of the energy released is in the form of seismic waves, which cause the ground to shake with potential damages. As can be easily understood, the strength limit for the rocky structures, the amount of stress built up in a given localized underground position, the weakest underground position that will have the initial fracture and the combined environmental forces such as that caused by tide, gravity of the moon and sun, thermal expansion, water body, and so on are not a precisely measurable parameters. An imminent prediction of the earthquake usually has to rely on precise modeling of these parameters.

The progress of the technologies, such as remote sensing technology, sensor technology, network technology, computer and signal processing technology have provided seismologists with new capabilities that make the long-term and intermediate-term earthquake prediction more and more practical. It becomes more and more feasible to predict the most likely location and scale of a big earthquake. Realizing the fact that, when the built-up stress is close to the limit that a fracture starts, a fracture will happen only with a relatively small incremental constructional force, such as mentioned earlier, that of the tide and/or the gravity of the moon and sun. Such incremental force can also be artificially created in a controlled fashion, such as through underground or surface explosion, or other types of impact.

Figure 2:
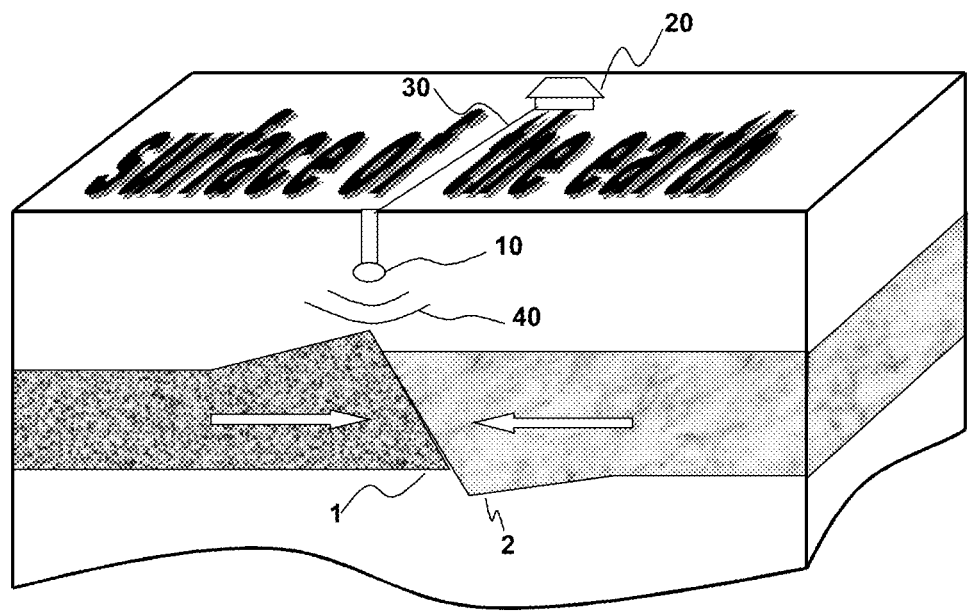
FIG. 2 illustrates an example of method and system to artificially trigger the earthquake.

FIG. 2 illustrates an example of method and system to artificially trigger the earthquake. Based on long-term and intermediate-term predictions, we are able to determine the localized region of at least some of the catastrophic earthquakes. Once the region is determined, we can build underground explosion facilities 10 ahead of time in the region. Such underground explosion facilities 10 may consist of a single explosion spot, or more preferably an array of explosion cells that can be controlled to explode synchronously. One of the advantages of utilizing an array of explosive cells is that, a single accident of a cell among the plurality of cells will not jeopardize the overall plan. The synchronized explosion of the array of cells is preferably to form a lens focus effect of the shockwaves towards the weakest point of the stress built-up rocky structures. The depth of the underground explosive cells need to be chosen such that the explosion itself will not cause any damage to the surface buildings and other man-made facilities. The potential pollution that may be caused by the underground explosion must also be carefully controlled. The initial quake point to be triggered should be chosen to minimize the damage, such as to be far away from dense populated areas, dams, and other critical facilities. When the choices cannot be made to meet all the requirements with the given technological limitations, trade-offs must be made to minimize the damage. Generally speaking, the earthquake may be triggered early so that the elastic strain energy can be triggered to release in a smaller scale before it is accumulated by too much to cause larger overall damage. However, the energy needed to trigger the earthquake earlier is also higher. A trade-off between the needed triggering energy (and thus the cost) and the overall damage of the triggered earthquake need to be carefully made. Triggering too late may miss the opportunity and the explosives may even enhance the damaging energy when the earthquake happens naturally before the triggering action.

The at least one explosive cells 10 need to be connected via reliable communication links 30 to a controller in a control office 20. After determining the triggering time of the earthquake, evacuations and other mitigation and relief preparations need to be carried out and completed prior to the triggering time. The planned triggering time may need to be announced to make sure all people who need to know are reached. Preferably, immediately prior to the predetermined triggering time, a final warning is also issued. At the predetermined triggering time, the control office 20 initiates the explosion of the cell 10 and the shockwaves 40 to propagate to the potential hypocentre. The earthquake monitoring stations (not shown in the drawing) closely monitor and determine whether the total release energy is higher than the explosion energy and in line with the expected values, and if the answer is positive, the artificial triggering of the earthquake is successful.

The explosion devices installed in the at least one cells 10 may be regular explosive devices, and may also be a nuclear device. In the event of using a nuclear device, pollution control measures must be carefully implemented.

The triggering process of the earthquake may be designed to be a single shock, or a sequential series of shocks. The latter may successfully divide the total accumulated earthquake energy into a plurality of lower scale earthquakes along a distance of fault line or in a distributed area, to reduce the damage.

The triggering time may be chosen by synchronizing with certain constructive natural forces such as tide and gravity of the moon and sun, to save the energy produced by the artificial cells 10. Alternatively, the triggering time may be coincident with the predicted time of an imminent prediction, and in the event that the prediction is accurate, the triggering action is cancelled; in the event that the predicted time nearly passed and no earthquake had happened, then the triggering is activated to induce the earthquake to happen before the predicted time window ends.

To allow sufficient time to build the underground cells 10, we may build more cells in a larger area based on early preliminary predictions, and when time becomes closer and more accurate predictions become available, we selectively load and activate some of the cells. When the initial activation of the cell begins, it is also possible to adaptively adjust the further activation of the rest prepared cells 10 real-time based on the feedback information received from of the sensors (not shown in the drawing). The real-time adaptive control based on the feedback may be implemented in a controller in the control office 20.

The triggering force may also be implemented by other forces with predictable impact time than an explosion.

Figure 3:
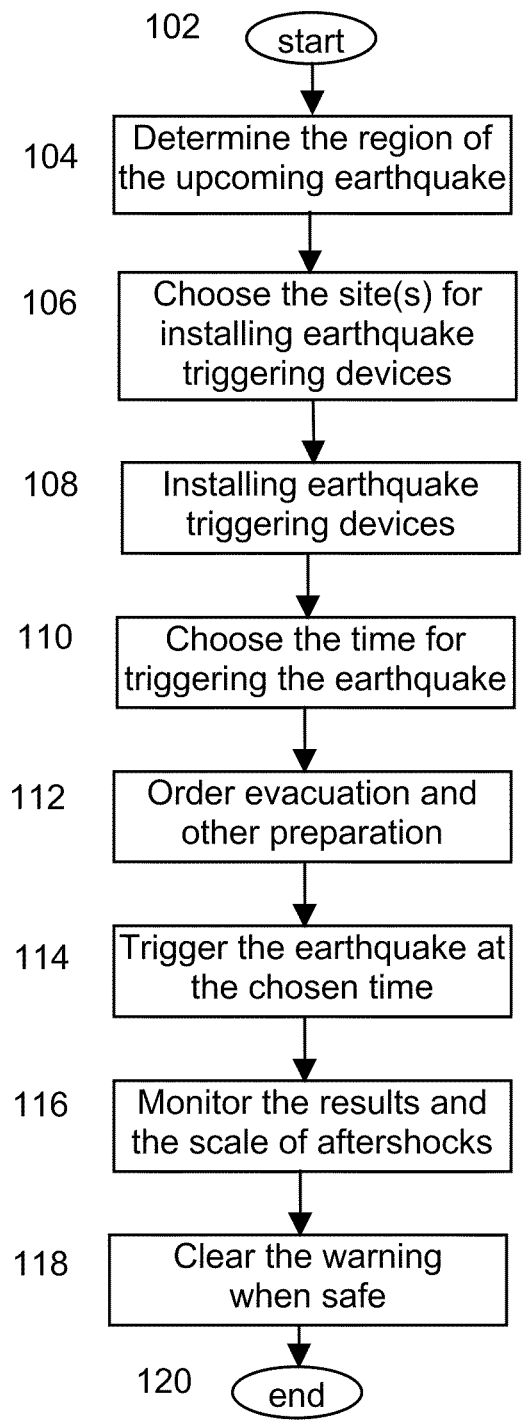
FIG. 3 illustrates exemplary steps to artificially trigger the earthquake at a prepared time for minimizing the loss.

FIG. 3 illustrates exemplary steps to artificially trigger the earthquake at a prepared time for minimizing the loss. The process begins at step 102. First, through long-term and/or intermediate-term prediction technology, a catastrophic earthquake is determined to happen, and the region of the upcoming earthquake is predicted at step 104. Since the predicted earthquake scale would be catastrophic, an artificial triggering is worth implementing. The next step 106 is to choose one or multiple suitable sites to install the earthquake triggering devices. Many factors need to be considered in choosing the sites, for the effectiveness of triggering the earthquake and for minimizing the loss and harmful side effects, such as pollution. Once the sites are chosen, at step 108, the triggering devices are built and installed. Next, at step 110, a triggering time need to be carefully chosen. The triggering time cannot be too early, because it needs higher triggering power to cause the earthquake energy to be released, increasing the risk of unsuccessful triggering. The triggering time cannot be chosen too late either, because it increases the risk that the earthquake occurs naturally and unprepared before the planned triggering time, causing high losses. Once the triggering time is determined, at step 112, evacuation and other preparation work need to be completed before the triggering time. When the planned triggering time arrives, at the step 114, the triggering action is initiated. If the implementation is based on correct prediction and calculation, the earthquake would be successfully triggered, and the earthquake energy begins to release at the triggering time. The step 116 confirms the success of triggering through monitoring the seismic activities. Once it is concluded that the major seismic energy has been released and the aftershocks would not cause any high risks, announcements can be made at step 118 to recover the normal life step by step, and the process ends 120.

Certain terms are used to refer to particular components. As one skilled in the art will appreciate, people may refer to a component by different names. It is not intended to distinguish between components that differ in name but not in function.

The terms "including" and "comprising" are used in an open-ended fashion, and thus should be interpreted to mean "including, but not limited to". The terms "example" and "exemplary" are used simply to identify instances for illustrative purposes and should not be interpreted as limiting the scope of the invention to the stated instances.

Also, the term "couple" in any form is intended to mean either a direct or indirect connection through other devices and connections.

It should be understood that various modifications can be made to the embodiments described and illustrated herein, without departing from the invention, the scope of which is defined in the appended claims.

I claim:

1. A method, comprising the steps of:
    determining a region of an upcoming catastrophic earthquake through at least one of long-term, intermediate-term and short-term earthquake predictions;
    installing, in at least one location suitable for triggering the earthquake based on the determined region, an earthquake artificial triggering system that is based on impact generation;
    choosing a time at which the earthquake is to be triggered, where the chosen time is after the installing time of the earthquake artificial triggering system and prior to an initial and original natural occurrence time of said earthquake at its epicenter within the determined region;
    ordering evacuation of people prior to the chosen time; and
    activating, at the chosen time, the earthquake artificial triggering system to induce the earthquake to start immediately following the activation of the earthquake artificial triggering system;
    wherein said installing the earthquake artificial triggering system and said activating the earthquake artificial triggering system including placing a plurality of impact generating cells at a plurality of positions for adaptably determining an activation scheme of the plurality of impact generating cells includes:
    activating the impact generating cells in a time sequence and ordering their impacting power from lowest to highest until the earthquake is triggered; and
    activating the impact generating cells with a timing scheme and arranging the impact generating cells with an impact magnitude relation that cause individual shockwaves together to form a constructive superposition onto a focus point located in underground geological structures that accumulated an elastic energy leading to the earthquake.

2. The method of claim 1, wherein the activating step includes causing the earthquake artificial triggering system to generate at least one impact to underground geological structures that accumulated an elastic energy leading to the earthquake.

3. The method of claim 2, wherein said impact is caused by at least one explosion.

4. The method of claim 1, further comprising, prior to the chosen time, performing at least one of:
    evacuating animals;
    reinforcing buildings and facilities;
    reducing water levels in reservoirs;
    securing inflammable, explosive and hazard materials;
    shutting down unnecessary equipment; and
    enhancing emergency response capabilities and measures.

5. The method of claim 1, wherein said choosing a time includes choosing a time that makes use of a constructive force of at least one of tide, gravity of the moon and sun, thermal expansion and other natural forces.

6. The method of claim 1, wherein said step of installing the earthquake artificial triggering system in at least one location suitable for triggering the earthquake based on the determined region further includes choosing the location for triggering the earthquake by at least one of:
    staying away from dense population;
    staying away from critical facilities;
    being within the determined region of the upcoming catastrophic earthquake;
    being close to the determined region of the upcoming catastrophic earthquake;
    being at a predicted epicenter;
    being close to a predicted epicenter; and
    being close to a predicted weak point in the underground geological structures for initial seismic energy release.

7. The method of claim 1 further includes, during and after the activating step, a step monitoring a total released energy of a triggering impact and the earthquakes.

8. The method of claim 1 further includes reducing at least one of impacting power and power density of an earthquake energy releasing process, comprising at least one of the steps of:
    inducing the earthquake to a series of sub-quakes through a plurality of locations of triggering and sequential triggering; and
    inducing the earthquake at the chosen time, wherein the chosen time is earlier than the original natural occurrence time of the earthquake.

9. A method, comprising the steps of:
    determining a region of an upcoming catastrophic earthquake through at least one of long-term, intermediate-term and short-term earthquake predictions;
    installing, in at least one location suitable for triggering the earthquake based on the determined region, an earthquake artificial triggering system that is based on impact generation, prior to an initial and original natural occurrence time of the earthquake at its epicenter within the determined region;
    predicting a time window of an earthquake occurrence in reference to its epicenter within the determined region through at least one of the long-term, intermediate-term and short-term earthquake predictions and an imminent prediction;
    announcing the predicted time window of occurrence of the earthquake ahead of time to all people who need to know;
    evacuating the people prior to the predicted time window; and
    if within the time window the predicted earthquake occurred, refraining from activating the earthquake artificial triggering system;
    if at the end of the time window the predicted earthquake has not occurred, activating the earthquake artificial triggering system to induce the earthquake to start immediately following the activating action;
    wherein said installing the earthquake artificial triggering system and said activating the earthquake artificial triggering system including placing a plurality of impact generating cells at a plurality of positions for adaptably determining an activation scheme of the plurality of impact generating cells includes:
    if at end of the time window the predicted earthquake has not occurred, activating the impact generating cells in a time sequence and ordering their impacting power from lowest to highest until the earthquake is triggered; and
    if at end of the time window the predicted earthquake has not occurred, activating the impact generating cells with a timing scheme and arranging the impact generating cells with an impact magnitude relation that cause individual shockwaves together to form a constructive superposition onto a focus point located in underground geological structures that accumulated an elastic energy leading to the earthquake.

10. A system for artificially triggering an upcoming catastrophic earthquake to occur at a known time so that evacuation can be carried out prior to the known time, comprising:
   at least two impact generating cells for generating at least one burst of shockwaves to underground geological structures that accumulated an elastic energy leading to the earthquake;
   an array of sensors for sensing seismic parameters before, during and after activating at least one out of the at least two impact generating cells;
   a controller for signaling activation of at least one out of the at least two impact generating cells, and for receiving and processing sensor signals from the array of sensors; and
   at least one signal link coupling the at least two impact generating cells and the array of sensors with the controller, for conveying control and the sensing signals;
   whereby the system is operable to activate at least one out of the at least two impact generating cells to create shockwaves for inducing the upcoming catastrophic earthquake to occur at a time that is under control of an operator of the controller and is prior to a time of initial and original natural occurrence of said earthquake in reference to its epicenter; and
   wherein said at least two impact generating cells are placed at a plurality of positions for adaptably determining an activation scheme of the at least two impact generating cells includes at least one of:
   activating the impact generating cells in a time sequence and ordering their impacting power from lowest to highest until the earthquake is triggered; and
   activating the impact generating cells with a timing scheme and arranging the impact generating cells with an impact magnitude relation that cause individual shockwaves together to form a constructive superposition onto a focus point located in underground geological structures that accumulated an elastic energy leading to the earthquake.

11. The system of claim 10, wherein said impact generating cell consists of an explosion device.

12. The system of claim 11, wherein said explosion device is a nuclear explosion device.

13. The system of claim 10, wherein said impact generating cell is installed underground.

14. The system of claim 10, wherein said focus point is chosen at an estimated weak point of the underground geological structures that accumulate the elastic energy leading to the earthquake.

* * * * *